INVENTOR
STANLEY L. PIERCE JR.
BY
ATTORNEYS.

United States Patent Office 3,431,928
Patented Mar. 11, 1969

3,431,928
MULTIPLE STAGE GOVERNOR VALVE ASSEMBLY FOR ESTABLISHING A SPEED-PRESSURE SIGNAL
Stanley L. Pierce, Jr., Madison Heights, Mich., assignor to Ford Motor Company, Dearborn, Mich., a corporation of Delaware
Filed Oct. 12, 1966, Ser. No. 586,198
U.S. Cl. 137—54            10 Claims
Int. Cl. G05d *13/10, 13/30, 13/22*

ABSTRACT OF THE DISCLOSURE

A compound governor valve assembly adapted to produce a speed signal that is proportional in magnitude to the speed of rotation of a rotary member comprising a primary modulating valve and a secondary modulating valve, the output pressure of the primary valve being used as a speed signal and the output pressure of the secondary valve being used to modify the characteristics of the primary valve to produce a desired speed-pressure relationship.

*General description of the invention*

My invention relates more particularly to a speed sensor comprising a compound valve assembly capable of establishing a pressure signal that is proportional in magnitude to the speed of rotation of a driven member in a control valve system.

The improvement of my invention can be applied to a control valve system for an automatic power transmission mechanism in an automotive vehicle driveline. Such systems include rotary gear elements adapted to establish multiple torque delivery paths between a driving member and a driven member. The speed ratio that is established during torque delivery between the driving and driven members is determined by the relative motion of the gear elements. This motion is controlled by clutches and brakes that are actuated and released by fluid pressure operated servos.

Control systems for initiating speed ratio changes in the gearing include a pressure source in the form of a pump driven by an engine-powered member of the driveline. Conduit structure connects the pump to the servos. Pressure distribution to the various servos is in turn controlled by shift valves situated in and partly defining the conduit structure. The shift valves respond to engine torque or engine torque demand and the driven speed of the driven member to initiate speed ratio shifts as pressure selectively is distributed to and exhausted from the various servos.

In vehicle power transmission mechanisms which require two ratio shifts during the acceleration period, the vehicle speed signal that exists for any given engine torque demand, when a ratio shift from the low speed ratio to an intermediate speed ratio is initiated, should be substantially less than the magnitude of the speed signal that exists for the same engine torque demand as the transmission system shifts from the intermediate speed ratio to the higher speed ratio. Unless there is a sufficient variation in the magnitude of the speed pressure signal during the acceleration period, it becomes difficult to establish automatic shift points. This is due in part to the inherent error due to accumulated tolerances in the valve system itself.

One proposal for eliminating this condition is disclosed in U.S. Duffy Patent No. 3,048,184, which is assigned to the assignee of our invention. The Duffy governor valve arrangement comprises a single modulator valve element and an inhibitor valve element which cooperate to produce a speed signal of a useful magnitude when the driven speed is at a relatively high value. The relationship between governor pressure and the driven shaft speed in the Duffy valve arrangement is characterized by a relatively suppressed slope, as indicated in FIGURE 4 of the Duffy patent.

At speeds less than a calibrated minimum value, the speed signal produced by the Duffy system falls to zero since the inhibitor valve prevents the modulating action of the modulator valve. A ratio shift is achieved in a power transmission mechanism employing the Duffy system at the driven speed at which the so-called breakpoint occurs. A second shift can be obtained when an advanced driven shaft speed is reached, at which time the governor pressure signal is of a sufficiently high magnitude to permit an adequate control response.

In the improved governor valve arrangement of my invention, it is possible to obtain a useful speed signal when the driven shaft speed is of a relatively high magnitude. Thus the final upshift during the acceleration period from an intermediate speed ratio to a high speed ratio can be achieved at the desired shift point regardless of whether the driven shaft speed is at the higher end of the characteristic governor curve.

I have achieved this desirable feature, however, without sacrificing the advantage of obtaining a useful speed signal when the driven shaft speed is less than the speed at which the breakpoint occurs. It is possible, therefore, to obtain a shift point at a speed between zero and the breakpoint speed and calibrate the shift valves accordingly. The shift valve that controls a subsequent ratio shift from the intermediate speed ratio to the high speed ratio can be calibrated independently, without reference to the requirements of the first speed ratio shift valve since the characteristic curve for the governor valve assembly can be tailored to meet the desired requirements of the intermediate-to-high speed ratio shift valves.

The provision of a governor valve mechanism that will produce an independent characteristic curve for each of several speed ratio shifts is an object of our invention.

It is a further object of my invention to provide a compound governor valve assembly having a pair of fluid pressure modulator valves, each of which is capable of modulating a control pressure that is distributed to it. I contemplate that our valve assembly will include a primary valve that is supplied with the line pressure from the pump which serves as a pressure source. The primary valve then will modulate this line pressure to produce a resultant pressure signal that is proportional in magnitude to the centrifugal force that acts upon the primary valve.

The output pressure of the secondary valve is distributed to a fluid pressure area on the primary valve. This produces a second primary valve actuating force that opposes the centrifugal force. This added force, of course, reduces the sensitivity of the primary valve due to changes in the speed of the driven member. The provision of a governor valve system having this characteristic is another object of my invention.

It is another object of my invention to provide a governor valve system of the type set forth in the preceding object wherein provision is made for rendering the secondary valve nonfunctional during rotation of the driven shaft at speeds less than a precalibrated value.

It is another object of my invention to provide a compound valve system of the type above set forth wherein both the primary and the secondary valves are actuated by centrifugal forces created by rotation of the shaft to which they are connected drivably.

It is a further object of my invention to provide a compound governor valve assembly as set forth in the preceding objects wherein the speed signals produced by the primary valve and by the secondary valve are related to the driven shaft speed with dissimilar functional relationships.

*Brief description of the figures of the drawings*

In FIGURE 1, numeral 10 designates a relatively stationary housing for a transmission mechanism capable of embodying our improved governor valve assembly. It can be bolted in the usual fashion to the engine block of an internal combustion engine in an automotive vehicle driveline.

Figure 1:
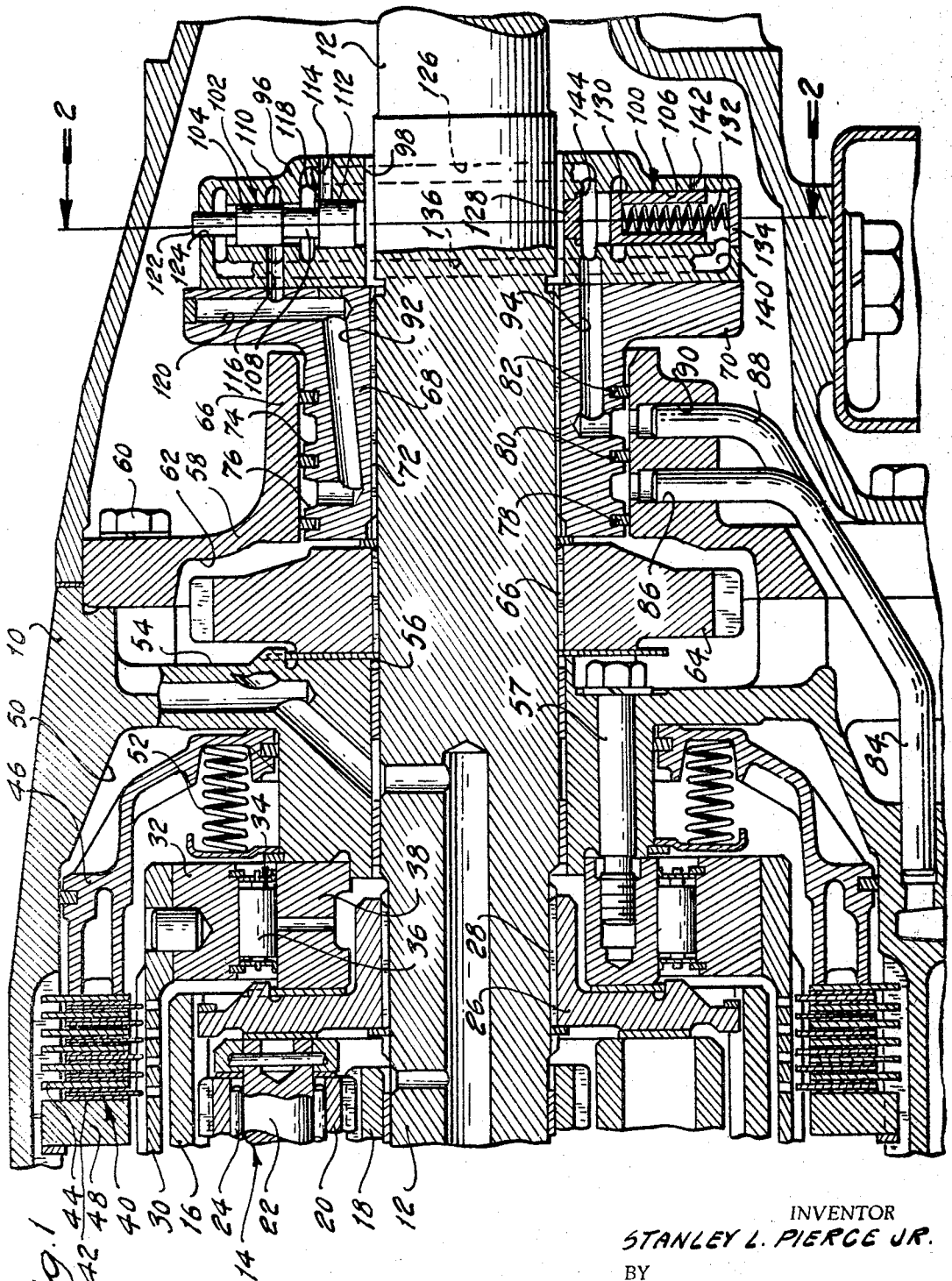
FIGURE 1 shows in longitudinal cross-sectional form a part of a gearing arrangement with which our improved governor valve mechanism can be used.

Numeral 12 designates a power output shaft or driven shaft which can be connected to an automotive vehicle driveshaft by means of a universal joint. The speed of rotation of the shaft 12 thus is directly related to the speed of the vehicle. Numeral 14 designates generally a planetary gear unit which forms in part a geared torque delivery path between the shaft 12 and the vehicle engine, which drives a rotary pump at a speed that is related directly to engine speed.

Gear unit 14 includes a ring gear 16, a sun gear 18, planet pinions 20 and a carrier 22 upon which the pinions 20 are journalled. Needle bearings 24 act as a bearing support for the pinions 20.

Ring gear 16 is connected directly to a torque delivery member 26, which is splined at 28 to the power output shaft 12.

By means of a suitable planet carrier member not shown, the carrier 22 is connected to a clutch drum 30 to which is connected outer race 32 for an overrunning brake assembly 34. Race 32 is formed with internal cam surfaces that cooperate with one-way brake rollers 36. A generally cylindrical inner race 38 is engaged by the rollers 36.

Race 38 and the rollers 36 inhibit rotation of the drum 30 in one direction, although freewheeling motion in the opposite direction is permitted. The carrier thus can act as a torque reaction member during torque delivery to the shaft 12.

Reaction torque can be distributed from the carrier to the casing in both directions if the multiple disc brake assembly 40 is applied. This brake assembly comprises brake discs 42 splined to external splines on the drum 30. They are situated in frictional engagement with stationary brake discs 44 carried by the housing 10. An annular piston 46 acts against the multiple disc brake assembly, thereby frictionally engaging the discs 42 and 44. The reaction of the force of piston 46 is taken by reacting ring 48, which is held axially fast with respect to the housing 10.

Piston 46 is slidably received within an annular cylinder 50 formed in the housing 10. Cylinder 50 and piston 46 cooperate to define a pressure chamber which can be supplied with working pressure to effect engagement of the brake assembly 40. A piston return spring 52 normally urges the piston 46 to a brake releasing position.

Housing 10 is formed with an end wall 54 having a central opening 56 within which shaft 12 is journalled. The race 38 can be held fast with respect to the wall 54 by retaining bolts 57.

An end closure plate 58 is secured to the wall 54 by bolts 60. It cooperates with the wall 54 to define an enclosure 62 within which a parking gear 64 is received.

The gear 64 is splined at 66 to the power output shaft 12. By means of a suitable positive acting parking brake mechanism, external teeth on the braking gear 64 can be engaged by a pawl to lock the shaft 12 against rotation with respect to the housing 10.

The closure plate 58 includes an axially extending, stationary sleeve 66 which surrounds a hub 68 for a governor valve support 70. Hub 68 is splined at 72 to the power output shaft 12. It includes a pair of axially spaced grooves 74 and 76 which are sealed from the interior of the housing 10 and from each other by sealing rings 78, 80 and 82.

Control pressure from the engine driven pump, not shown, is distributed to groove 76 through a conduit 84, one end of which is received by means of a force fit within a port 86 formed in the sleeve 66. The other end of passage 84 communicates with high pressure porting in the control valve assembly, not shown. Another conduit 88 distributes the pressure signal developed by the governor valve assembly of our invention to pressure sensitive parts of the control valve system. It is received by means of a force fit within a governor pressure port 90 formed in the sleeve 66. This port communicates with groove 74.

A first pressure distributor passage 92 formed in the hub 68 communicates with the annular groove 76. A second pressure distributor passage 94 in the hub 68 communicates with groove 74.

Figure 2:
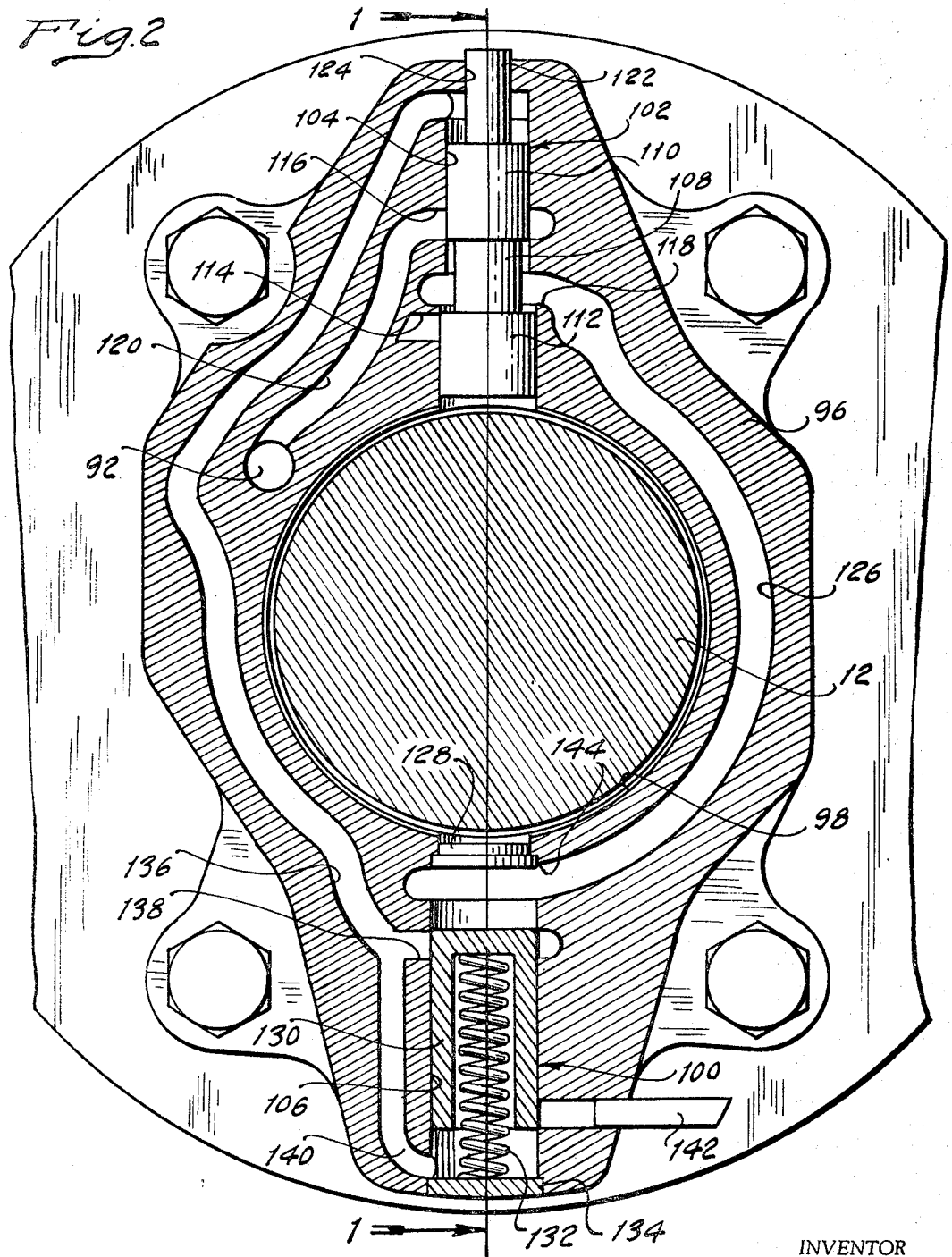
FIGURE 2 shows a transverse cross-sectional view of the governor valve of our invention as seen from the plane of section line 2—2 of FIGURE 1; and, FIGURE 3 is a chart showing the characteristic curve for the pressure signal that is produced by the governor valve mechanism of FIGURE 2.

Shown in FIGURE 2 are the primary and secondary valve assemblies of the improved governor valve mechanism of my invention. It includes a main valve body 96 which by preference is formed as a unitary casting with a central opening 98. This is adapted to surround power output shaft 12 as indicated. The common valve body 96 carries secondary valve 100 and primary valve 102, each valve being situated on diametrically opposed sides of the shaft 12. Valve 102 comprises a valve bore 104 formed in the body 96 in a radial disposition. The secondary valve 100 comprises a valve bore 106 which also extends in a radial direction. By preference the bores 104 and 106 are aligned so that they can be machined with a single drilling operation.

Slidably disposed in the bore 104 is a valve spool 108 having a pair of spaced valve lands 110 and 112. The diameter of land 110 is less than the diameter of land 112. An exhaust port 114 communicates with the bore 104 adjacent one edge of the land 112. A line pressure intake port 116 communicates with the bore 104 at a location adjacent the edge of land 110. A governor pressure output port 118 communicates with the bore 104 at a location intermediate the lands 110 and 112.

Port 116 is in fluid communication with control pressure passage 92 formed in the hub 68 through an internal passage 120 in the body 96. By preference, passage 120 as well as the other passages in the body 96, is formed by coring. The valve element 108 is formed with a reduced diameter part 122, which is slidably received within an end opening 124 in the body 96. This part 122 seals the end of the bore 104.

The degree of communication between passage 120 and the bore 104 is controlled by land 110. In a similar fashion the degree of communication between exhaust port 114 and bore 104 is controlled by land 112. Upon rotation of the shaft 12, the valve element 108 is urged radially outwardly under the influence of centrifugal force. This causes the valve element 108 to modulate the pressure in passage 120. As the centrifugal force increases upon an increase in speed of rotation of the shaft 12, the degree of communication between bore 104 and passage 120 increases while the degree of communication between bore 104 and the exhaust port 114 decreases. The modulated pressure that exists between the two lands 110 and 112 thus is an indicator of the speed of rotation of the shaft 12. This pressure acts upon the differential area of the lands 110 and 112 to oppose centrifugal force.

The modulated pressure is distributed from bore 104 to a governor pressure outlet passage 126 through governor pressure port 118. Passage 126 communicates directly with governor pressure passage 94 formed in the hub 68.

Passage 126 communicates also with the radially inward end of bore 106. The radially inward end opening of bore 106 is closed by a closure plug 128.

Slidably disposed within the bore 106 is a single diameter valve element 130. It is urged normally in a radially inward direction by a valve spring 132, which is seated at its radially outward end on a closure plug 134. This plug seals the radially outward end opening of the bore 106.

A feedback circuit hydraulically connects the secondary valve with the primary valve. This includes a feedback pressure passage 136 which communicates with the bore 106 at spaced locations. Such communication is established at a radially inward location by a valve port 138 located directly adjacent the inward edge of valve element 130. Communication at a radially outward location is established by valve port 140. An exhaust port 142 is situated at a radially outward location directly adjacent the outward edge of the valve element 130. A valve port 144 establishes communication between the radially inward end of the bore 106 and the passage 126.

The valve element 130 is capable of modulating the pressure in the passage 126 to produce a resultant pressure in passage 136 that varies in magnitude in accordance with changes in the speed of shaft 12. At speeds less than a predetermined value, however, the spring 132 is capable of sealing port 138, thereby inhibiting the modulating action of the secondary valve. At that time port 142 exhausts passage 136.

Figure 3:
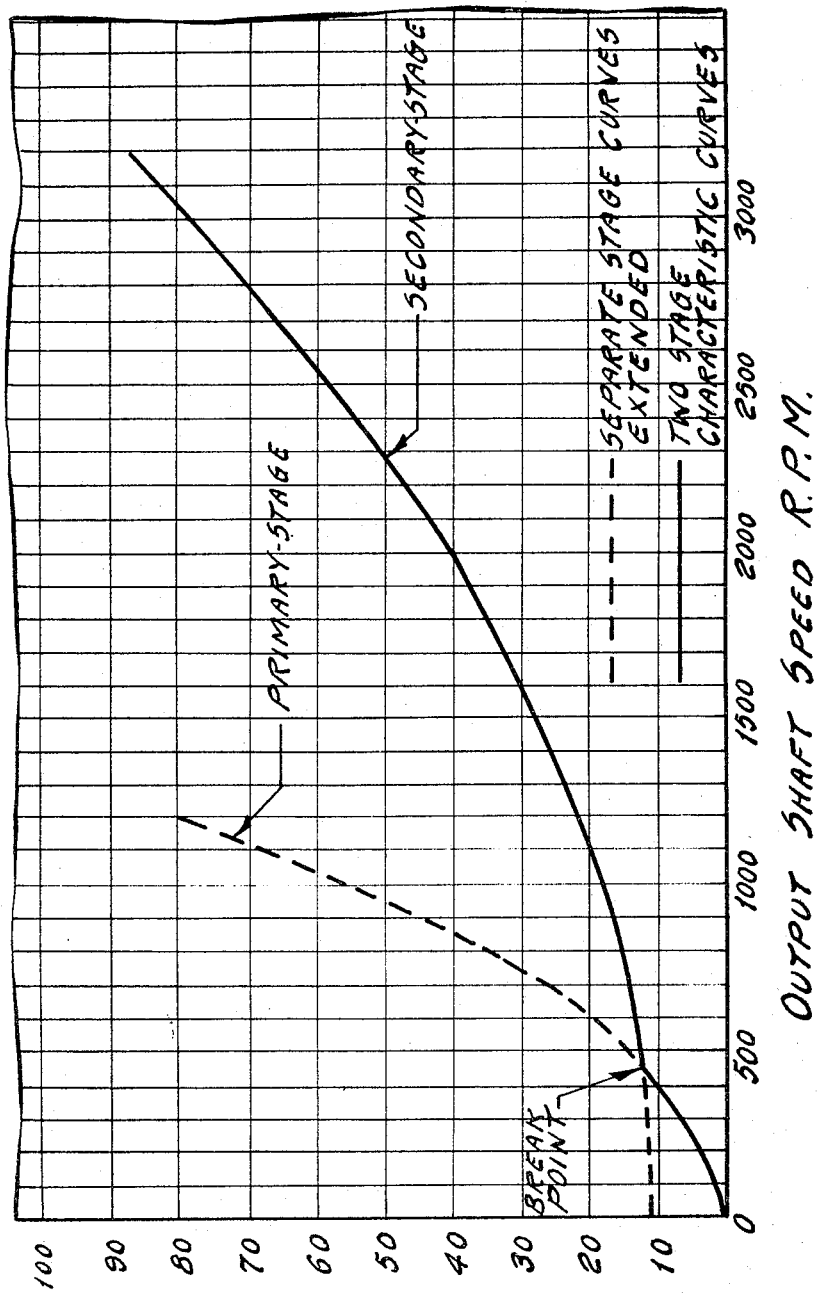

The operating characteristics of the governor of FIGURES 1 and 2 is illustrated in FIGURE 3. Each valve of the governor is capable of producing a modulated pressure which has an independent parabolic characteristic. The composite characteristic curve in FIGURE 3 has been illustrated by full lines. The theoretical extensions of each of the parabolic curves for the primary and secondary stages is indicated by dotted lines. The breakpoint is defined as the intersection of the two parabolic curves.

At any shaft speed in excess of the breakpoint speed, the regulated pressure of the secondary valve is fed back through the feedback circuit to the radially outward end of the primary valve. This changes the shape of the characteristic curve. The resultant curve is indicated in FIGURE 3 by the legend "secondary stage." At a speed less than the breakpoint speed, the pressure in passage 126 is the resultant of the modulating action of the primary valve only since the secondary valve is inactive. The variation of governor pressure upon increasing shaft speed is characterized by a relatively steep slope at any speed less than the breakpoint speed. It is during this stage of the operation that the governor pressure signal will cause the first speed ratio shift in the shift valve mechanism. Because of the relatively large slope of the charactertistc curve at lower speeds, the first shift point can be established accurately. Undesirable shift point influences due to manufacturing tolerances are reduced to a minimum.

When the combined influence of the governor pressure in passage 126 and the centrifugal force acting on the valve element 130 are sufficient to cause the valve element 130 to overcome the force of the spring 132, the secondary valve assembly will begin to modulate. This produces a secondary feedback signal pressure in passage 136. The feedback pressure acts upon the primary valve and opposes the influence of centrifugal force on the valve element 108. The resultant parabolic curve in the second operating stage thus is the result of the combined action of both the primary valve and the secondary valve.

Having thus described a preferred form of my invention, what I claim and desire to secure by U.S. Letters Patent is:

1. In a speed sensor in the form of a compound governor valve assembly capable of developing a pressure signal that is proportional in magnitude to the speed of rotation of a rotary member, a valve body connected to said member, a primary valve element carried by said valve body at a location spaced radially outwardly from the axis of rotation of said rotary member, a valve chamber extending from a radially inward location to a radially outward location, a pressure area formed on said valve element, a supply pressure passage communicating with said area, an exhaust port in said valve chamber at a location radially inward from said pressure area, a governor pressure passage communicating with said valve chamber at a location between the locations of said supply pressure passage and said exhaust port, said valve element controlling the degree of communication between said governor pressure passage and supply pressure passage, said valve elements being subjected to a centrifugal force as said governor valve assembly is rotated about the axis of said rotary member, the pressure in said governor pressure passage acting on said area to oppose the centrifugal force acting on said valve element, a secondary valve chamber, a secondary valve mounted for movement in said secondary valve chamber and having a pressure area thereon, a secondary area on said primary valve, a feedback circuit interconnecting said secondary area and the pressure area on said secondary valve, said governor pressure passage communicating with said secondary valve at one location and a secondary exhaust port communicating with said secondary valve at a location spaced radially outward from said one location, said secondary valve being adapted to modulte the pressure in said governor pressure passage to produce a resultant feedback pressure signal in said feedback circuit thereby modifying the regulating characteristics of said primary valve.

2. The combination as set forth in claim 1 wherein said secondary valve includes a valve spring acting thereon to urge it radially inwardly against the opposing influence of the pressure force of said governor pressure, said valve spring interrupting the modulating action of said secondary valve at speeds less than a predetermined value.

3. The combination as set forth in claim 1 wherein said primary valve and said secondary valve are situated on opposite sides of the axis of rotation of said rotary member.

4. The combination as set forth in claim 2 wherein said primary valve and said secondary valve are situated on opposite sides of the axis of rotation of said rotary member.

5. The combination as set forth in claim 1 wherein said feedback circuit distributes to said primary valve a pressure that acts upon said secondary area to oppose the influence of centrifugal force acting on said primary valve, thereby reducing the sensitivity of the modulating action of said primary valve upon changes in the speed.

6. The combination as set forth in claim 2 wherein said feedback circuit distributes to said primary valve a pressure that acts upon said secondary area to oppose the influence of centrifugal force acting on said primary valve, thereby reducing the sensitivity of the modulating action of said primary valve upon changes in the speed.

7. The combination as set forth in claim 1 wherein said valve body comprising a unitary cast structure adapted to be affixed to said rotary member, said primary valve and said secondary valve being located in said valve body on diametrically opposed sides of the axis of rotation of said rotary member.

8. The combination as set forth in claim 2 wherein said valve body comprising a unitary cast structure adapted to be affixed to said rotary member, said primary valve and said secondary valve being located in said valve body on diametrically opposed sides of the axis of rotation of said rotary member.

9. The combination as set forth in claim 3 wherein said valve body comprising a unitary cast structure adapted to be affixed to said rotary member, said primary valve and said secondary valve being located in said valve body on diametrically opposed sides of the axis of rotation of said rotary member.

10. The combination as set forth in claim 4 wherein said valve body comprising a unitary cast structure adapted to be affixed to said rotary member, said primary valve and said secondary valve being located in said valve body on diametrically opposed sides of the axis of rotation of said rotary member.

References Cited

UNITED STATES PATENTS

| 2,711,749 | 6/1955 | Hettinger | 137—56 |
| 2,889,844 | 6/1959 | McFarland | 137—54 |
| 2,911,987 | 11/1959 | Wayman | 137—56 X |
| 3,048,184 | 8/1962 | Duffy | 137—54 X |
| 3,139,102 | 6/1964 | Powell | 137—56 X |

CLARENCE R. GORDON, *Primary Examiner.*

U.S. Cl. X.R.

137—56